United States Patent
Del Carpio Vega et al.

(10) Patent No.: US 10,492,147 B2
(45) Date of Patent: Nov. 26, 2019

(54) FIRST RADIO CAPABLE DEVICE, ACCESS POINT AND METHODS FOR HANDLING ACCESS TO A WIRELESS MEDIUM

(71) Applicant: Telefonaktiebolaget LM Ericsson (publ), Stockholm (SE)

(72) Inventors: Luis Felipe Del Carpio Vega, Espoo (FI); Anna Larmo, Espoo (FI); Osman Nuri Can Yilmaz, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

(21) Appl. No.: 15/534,688

(22) PCT Filed: Dec. 19, 2014

(86) PCT No.: PCT/SE2014/051552
§ 371 (c)(1),
(2) Date: Jun. 9, 2017

(87) PCT Pub. No.: WO2016/099365
PCT Pub. Date: Jun. 23, 2016

(65) Prior Publication Data
US 2017/0347321 A1    Nov. 30, 2017

(51) Int. Cl.
H04W 52/02 (2009.01)
H04W 74/08 (2009.01)
H04W 72/10 (2009.01)
H04W 4/00 (2018.01)

(52) U.S. Cl.
CPC ....... *H04W 52/0277* (2013.01); *H04W 72/10* (2013.01); *H04W 74/0833* (2013.01); *H04W 4/00* (2013.01); *Y02D 70/00* (2018.01)

(58) Field of Classification Search
None
See application file for complete search history.

(56) References Cited

U.S. PATENT DOCUMENTS 6,813,260 B1 * 11/2004 Fogle ............... H04W 74/0875
370/338
6,973,335 B2   12/2005 Ganton
(Continued)

FOREIGN PATENT DOCUMENTS

JP         2011087145 A1     4/2011

OTHER PUBLICATIONS

Supplementary European Search Report for EP 14908529 (dated Oct. 19, 2017) 4 pages.
(Continued)

*Primary Examiner* — Laura N Nguyen
(74) *Attorney, Agent, or Firm* — Sage Patent Group

(57) ABSTRACT

A method performed in a wireless communication network for handling access of a first radio capable device, to a wireless medium in the wireless communication network. The wireless communication network prioritizes the first radio capable device over a second radio capable device for accessing the wireless medium based on a respective type of the first radio capable device and the second radio capable device. The first radio capable device is of a first type with an energy harvesting capacity or an energy harvesting capacity with a battery capacity below or equal a threshold, and the second radio capable device is of a second type with a non-energy harvesting capacity or an energy harvesting capacity with a battery capacity above the threshold.

32 Claims, 9 Drawing Sheets

(56) References Cited

U.S. PATENT DOCUMENTS

| | | | |
|---|---|---|---|
| 2010/0103883 A1 | 4/2010 | Das et al. | |
| 2010/0105449 A1 | 4/2010 | Shi et al. | |
| 2010/0150116 A1* | 6/2010 | Ji | H04W 74/0875 370/338 |
| 2012/0266251 A1 | 10/2012 | Birtwhistle et al. | |
| 2014/0003336 A1* | 1/2014 | Padden | H04W 72/10 370/328 |
| 2014/0035380 A1* | 2/2014 | Stevens | H02J 5/005 307/104 |
| 2014/0036877 A1* | 2/2014 | Campbell | H04W 72/10 370/336 |
| 2014/0286220 A1* | 9/2014 | Folkmanis | H04L 12/1868 370/312 |
| 2015/0201342 A1* | 7/2015 | Vannithamby | H04W 52/243 370/254 |
| 2015/0230105 A1* | 8/2015 | Negus | H04B 7/0408 370/329 |
| 2015/0319609 A1* | 11/2015 | Asterjadhi | H04W 74/006 370/328 |

OTHER PUBLICATIONS

"Telecommunications and information exchange between systems Local and metropolitan area networks—Specific requirements: Part 11: Wireless LAN Medium Access Control (MAC) and Physical Layer (PHY) Specifications," IEEE Std 802.11™-2012 (Revision of IEEE Std 802.11-2007) Mar. 29, 2012, 2793 pages.

International Search Report and Written Opinion of the International Searching Authority for International Application No. PCT/SE2014/051552 (dated Oct. 1, 2015) 11 pages.

"Wireless LAN Medium Access Control (MAC) and Physical Layer (PHY) Specifications (Part 11) Amendment 5: Sub 1 GHz License Exempt Operation," IEEE Draft Standard for Information Technology—Telecommunications and Information Exchange Between Systems—Local and Metropolitan Area Networks—Specific Requirements, IEEE P802.11ah/D2.0, Jun. 2014 (amendment to IEEE Std 802.11REVmc/D2.5, IEEE Std 802.11af/D6.0), 582 pages.

JP 2011087145A1, Published Apr. 28, 2011, Geo Systems Co Ltd., English-Language Translation, 22 pages.

* cited by examiner

FIRST RADIO CAPABLE DEVICE, ACCESS POINT AND METHODS FOR HANDLING ACCESS TO A WIRELESS MEDIUM

CROSS REFERENCE TO RELATED APPLICATIONS

This application is a 35 U.S.C. § 371 national stage application of PCT International Application No. PCT/SE2014/051552, filed on Dec. 19, 2014, the disclosure and content of which is incorporated by reference herein in its entirety.

TECHNICAL FIELD

Embodiments herein relate to a first radio capable device, an access point, and methods in a wireless communication network. In particular, embodiments herein relate to handling access to a wireless medium of the wireless communication network.

BACKGROUND

In a typical wireless communication network, radio capable devices, also known as wireless devices, mobile stations and/or user equipments (UEs), communicate via a wireless medium e.g. a radio channel e.g. via a Radio Access Network (RAN) or directly. Wireless Local Access Network (WLAN) systems based on IEEE 802.11, used for example in Industrial, Scientific and Medical (ISM) bands, access a wireless medium via contention based protocols complying with different regulatory domains. These types of systems are commonly referred to as Carrier Sense Multiple Access (CSMA) systems. WLAN systems are designed to support a plurality of services e.g. an IEEE 802.11ah system is designed to support large number of radio capable devices with low traffic profiles. By definition, a contention based protocol allows multiple radio capable devices to share the same spectrum by defining events that occur when two or more radio capable devices attempt to simultaneously access the same wireless medium and establishing rules by which a radio capable device provides reasonable opportunities for other radio capable devices to operate on the same wireless medium. In the standard IEEE 802.11 radio capable devices are referred to as Stations (STA) and Access Points (AP).

Receivers of STAs may not always be powered on, which means STAs may be in a doze-state. In addition, 802.11 STAs use Distributed Coordination Function (DCF) or Enhanced Distributed Channel Access (EDCA) as contention based access functions. The DCF is a basic contention based function where STAs access the shared wireless medium with similar access parameters. Thus, the access procedure of the DCF does not offer differentiated Quality of Service (QoS). EDCA is a contention based function where STAs access the shared wireless medium with differentiated access parameters. Currently the standard 802.11ah supports two types of devices: Sensor type STAs, including Energy Limited STAs, and non-sensor type STAs. Implicitly these are battery powered or electrical grid powered. The EDCA access parameters are dependent on the access category of packets/flows and in 802.11ah also on the type of the STA. Thus, the EDCA provides differentiated Quality of Service (QoS) at a Medium Access Control (MAC) level.

The access procedure for the DCF is as follows: A STA determines whether a wireless medium is idle via a Channel Sensing (CS) function in two different time intervals. The first time interval is a deterministic time DCF Interframe Space (DIFS) and its duration is specified according to a physical layer technology in IEEE 802.11/IEEE 802.11ah. The second time interval is a back-off time is a random time that STAs are required to sense the wireless medium before starting transmission. After the STA has determined that the wireless medium is idle, the transmission can begin. Otherwise, the STA has to wait until the wireless medium is idle and follow specific procedures defined in IEEE 802.11/IEEE 802.11ah.

The access procedure for the EDCA is as follows: A STA determines whether the wireless medium is idle via the CS function in two different time intervals. The first time interval is a deterministic time Arbitration Inter-frame Space (AIFS) with a duration that is defined as AIFS=SIFS+AIFSN*aTimeSlot, where SIFS means Short Interframe Space and AIFSN means Arbitration Interframe Space Number and is dependent of traffic/flow access category in IEEE 802.11 and also type of STA in IEEE 802.11. The second time interval is a back-off time is a random time that STAs are required to sense the wireless medium before starting transmission. After the STA has determined that the wireless medium is idle during both the AIFS and the back-off time, the transmission can begin. Otherwise, the STA has to wait until the wireless medium is idle and follow specific procedures defined in IEEE 802.11/IEEE 802.11ah.

In the IEEE 802.11 there is also a Point Coordination Function (PCF) defined for channel access. PCF is meant to work with DCF and provide a contention-free access controlled by a capable Access Point (AP) called 'PC'. A contention-free period starts when the access point gains control of the wireless medium by determining the wireless medium is idle during a PCF Inter-frame Space (PIFS) period defined as PIFS=SIFS+aTimeSlot. A PIFS is smaller than a DIFS.

The access parameters of the EDCA procedure are based on access category of packets/flows in IEEE 802.11 and also on type of STA in 802.11ah. The EDCA procedure gives access priority to sensor devices over non-sensor devices. Also, the DCF procedure does not provide differentiated access to any device type in WLAN. This results in wireless communication networks that handle access to wireless media randomly or based on whether the radio capable device is of a sensor type or not, this in its turn leads to a nonflexible solution with a reduced performance of the wireless communication network.

SUMMARY

It is therefore an object of embodiments herein to provide a mechanism that provides access to a wireless medium in a flexible manner, improving the performance of the wireless communication network.

According to a first aspect of embodiments herein, the object is achieved by a method performed in a wireless communication network for handling access of a first radio capable device, to a wireless medium in the wireless communication network. The wireless communication network prioritizes the first radio capable device over a second radio capable device for accessing the wireless medium based on a respective type of the first radio capable device and the second radio capable device. The first radio capable device is of a first type with an energy harvesting capacity or an energy harvesting capacity with a battery capacity below or equal a threshold, and the second radio capable device is of a second type with a non-energy harvesting capacity or an energy harvesting capacity with a battery capacity above the threshold.

According to a second aspect of embodiments herein, the object is achieved by providing a method performed in a first radio capable device for handling access to a wireless medium in a wireless communication network. The first radio capable device gains access to the wireless medium by using an access parameter, which access parameter is based on a type of the first radio capable device. The first radio capable device is of a first type being defined by an energy harvesting capacity or an energy harvesting capacity with a battery capacity below or equal a threshold. The access parameter gives the first radio capable device priority, to access the wireless medium, over a second radio capable device, which second radio capable device is of a second type with a non-energy harvesting capacity or an energy harvesting capacity with a battery capacity above the threshold.

According to another aspect of embodiments herein, the object is achieved by providing a method performed in an access point for handling access of a first radio capable device to a wireless medium in a wireless communication network. The access point configures the first radio capable device with an access parameter, which access parameter prioritizes the first radio capable device over a second radio capable device for accessing the wireless medium based on a respective type of the first radio capable device and the second radio capable device. The first radio capable device is of a first type with an energy harvesting capacity or an energy harvesting capacity with a battery capacity below or equal a threshold, and the second radio capable device is of a second type with a non-energy harvesting capacity or an energy harvesting capacity with a battery capacity above the threshold.

According to yet another aspect of embodiments herein, the object is achieved by providing a first radio capable device for handling access to a wireless medium in a wireless communication network. The first radio capable device is configured to gain access to the wireless medium by being configured to use an access parameter, which access parameter is based on a type of the first radio capable device. The first radio capable device is of a first type being defined by an energy harvesting capacity or an energy harvesting capacity with a battery capacity below or equal a threshold. The access parameter giving the first radio capable device priority, to access the wireless medium, over a second radio capable device. The second radio capable device is of a second type with a non-energy harvesting capacity or an energy harvesting capacity with a battery capacity above the threshold.

According to still another aspect of embodiments herein, the object is achieved by providing an access point for handling access of a first radio capable device to a wireless medium in a wireless communication network. The access point is adapted to configure the first radio capable device with an access parameter, which access parameter prioritizes the first radio capable device over a second radio capable device for accessing the wireless medium based on a respective type of the first radio capable device and the second radio capable device. The first radio capable device is of a first type with an energy harvesting capacity or an energy harvesting capacity with a battery capacity below or equal a threshold, and the second radio capable device is of a second type with a non-energy harvesting capacity or an energy harvesting capacity with a battery capacity above the threshold.

By having the access procedure provide priority access for radio capable devices with an energy harvesting capacity or an energy harvesting capacity with a battery capacity below or equal a threshold, these devices may be able to communicate instead of being blocked by other radio capable devices that are not limited in operation. This leads to a more efficient operation and improves the performance of the wireless communication network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
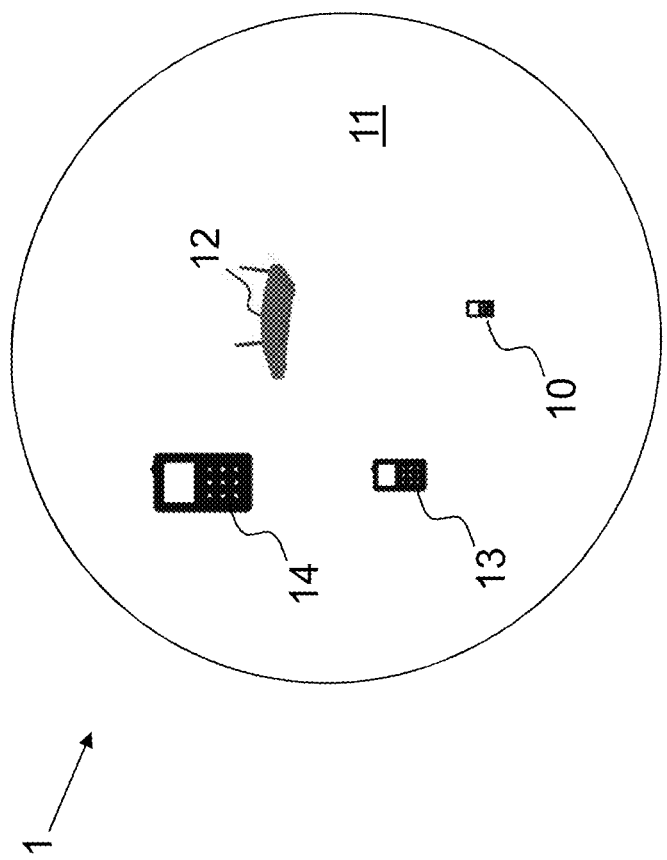
FIG. 1 is a schematic block diagram depicting a wireless communication network according to embodiments herein.

The figures are schematic and simplified for clarity, and they merely show details which are essential to the understanding of the embodiments presented herein, while other details have been left out. Throughout the disclosure, the same reference numerals are used for identical or corresponding parts or actions.

Embodiments herein relate to wireless communication networks in general and in particular wireless communication networks that use a contention based access procedure such as WLANs. FIG. 1 is a schematic overview depicting a wireless communication network 1. The wireless communication network 1 may use a number of different technologies, such as Wireless Local Access Network (WLAN), any 802.11 technique, any 802.15 technique e.g. Wireless Personal Access Network (WPAN), just to mention a few possible implementations. In the following, a WLAN is merely used as an example. The described solution may just as well be applicable to any other CSMA based systems, such as 802.15.4 radios or similar.

The wireless communication network 1 may be multiple-access networks capable of supporting multiple radio capable devices by sharing the available network resources that cover a geographical area which is divided into radio areas or cells being served by access points. The illustrated wireless communication network 1 comprises an access point 12 providing radio coverage over a certain area 11. The access point 12 may also be referred to as a wireless router, access node, a radio base station and e.g. a NodeB, an evolved Node B (eNB, eNode B), a base transceiver station, Access Point Base Station, base station router, or any other network unit capable of communicating with a radio capable device within the area served by the access point 12 depending e.g. on the radio access technology and terminology used. The access point 12 may serve one or more areas of different or same frequencies. The access point 12 may e.g. serve radio capable devices of different types. A first radio capable device 10 with an energy harvesting capacity or an energy harvesting capacity with a battery capacity below or equal a threshold, i.e. with none or very limited battery capacity referred to also herein as a first type or a battery-less STA, may communicate in the wireless communication network 1. Furthermore, different radio capable devices, such as another radio capable device 13 being a sensor type STA, and a third radio capable device 14 being a non-sensor type STA, may also communicate within the wireless communication network 1. These radio capable devices, such as the other radio capable device 13 and the third radio capable device 14, are examples of a second radio capable device of a second type with a non-energy harvesting capacity, e.g. the third radio capable device 14, or an energy harvesting capacity with a battery capacity above the threshold, e.g. the other radio capable device 13.

In the wireless communication network 1, the radio capable devices, also known as Stations (STA), user equipments and/or a wireless terminals, may communicate via the access point 12 or directly with one another. It should be understood by the skilled in the art that "radio capable device" is a non-limiting term which means any wireless terminal, station, user equipment, Machine Type Communication (MTC) device, a Device to Device (D2D) terminal, or node e.g. Personal Digital Assistant (PDA), laptop, mobile phone, sensor, relay, mobile tablets or even a small base station communicating within respective area.

Portable energy harvesting mechanisms, also known as energy scavenging, are becoming widespread, these mechanisms allow the transformation of different physical phenomena into electrical power which can be used in e.g. the first radio capable device 10. Given this energy harvesting technology, there can be two wide categories for the first type of radio capable devices. The first category is a battery-powered energy harvesting device which may use the harvested energy to recharge the battery and/or to partially power the first radio capable device 10. The second category is a battery-less, i.e. with a battery capacity below or equal a threshold, energy harvesting device which fulfills any of the following conditions: the radio capable device does not have a battery, or there is not enough energy in the battery to power the radio capable device on, the battery of the radio capable device cannot store the energy any longer, and the radio capable device will be only powered on when there are suitable physical phenomena from which to harvest energy for the radio capable device. The threshold may thus be defined by an energy level enough to power on the first radio capable device 10, or an energy level indicating that below or equal the energy level the radio capable device has no battery capacity. The threshold, e.g. the energy level, may be defined for amount of energy or storage time of energy of a battery of the first radio capable device 10. The first radio capable device 10 being of the first type has a limited opportunity window for accessing a wireless medium, limited power to spend determining if the wireless medium is idle/busy, and finally limited power to accomplish a successful transmission. The wireless medium may be a shared medium such as a radio channel or an ISM band. With an access mechanism suggested herein, the first radio capable device 10 have priority over the other radio capable device 13 and the third radio capable device 14 when gaining access to the wireless medium, such as a radio channel, by e.g. accessing the radio channel quicker with a reduced sensing time interval. This results in an improved performance of the wireless communication network 1 enabling communication for the first radio capable device 10 with energy harvesting capacity or an energy harvesting capacity with a battery capacity below or equal the threshold.

Embodiments herein address the case where second type of devices, such as grid powered or battery powered radio capable devices, content for wireless medium access together with a first type of radio capable device, such as the first radio capable device 10, providing the possibility for the radio capable devices of the first type to access the wireless medium within a small opportunity window or with a higher transmission power if one or more conditions are met without degrading the requirement of ISM bands to provide a reasonable opportunity to transmit to other radio capable devices. It should be noted that the embodiments herein are backward compatible with the standards IEEE 802.11 and 802.11ah.

Figure 2:
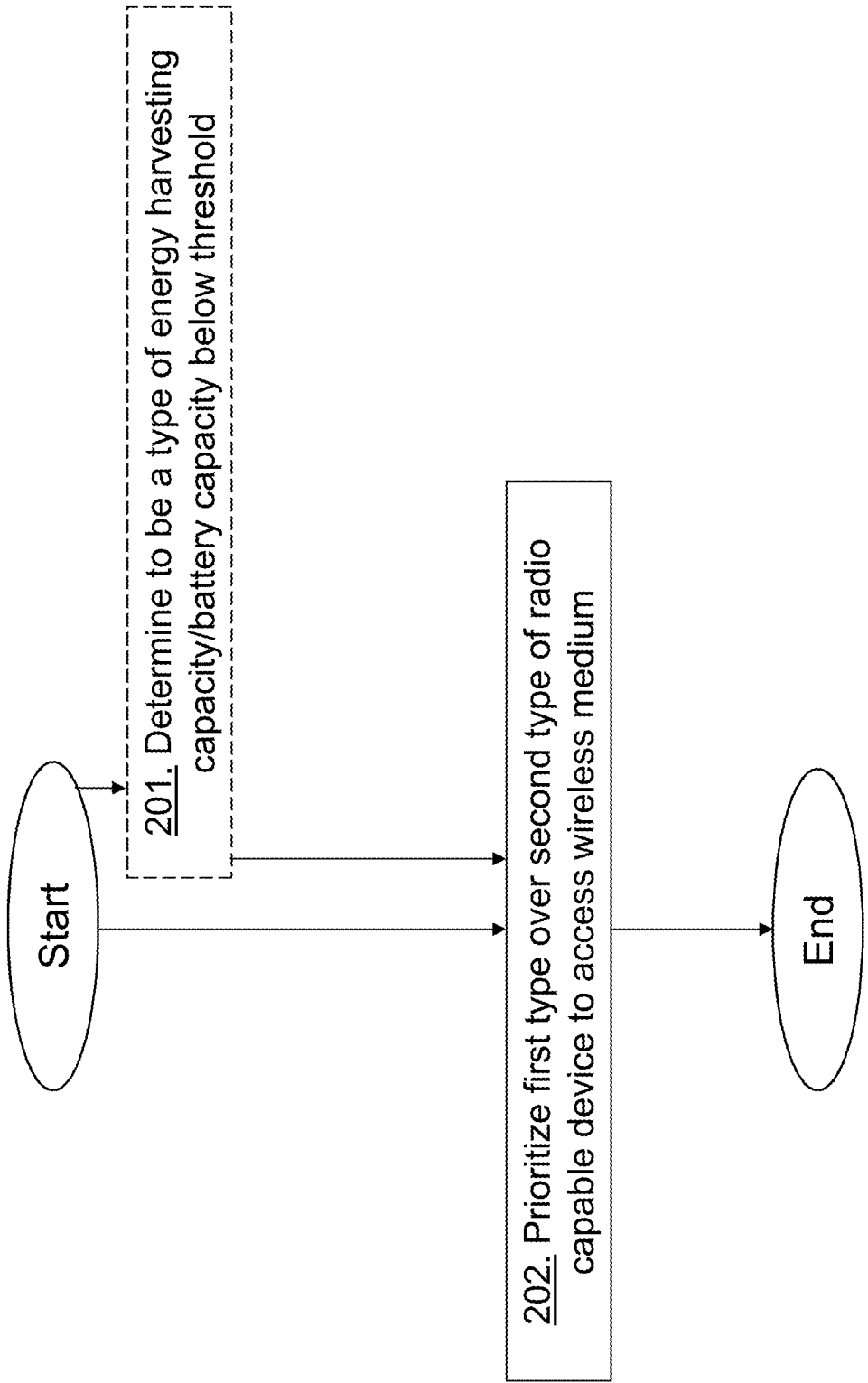
FIG. 2 is a schematic flowchart depicting a method performed in a wireless communication network according to embodiments herein.

The method actions performed in the wireless communication network 1 for handling access of the first radio capable device 10 to the wireless medium in the wireless communication network 1 according to some embodiments will now be described with reference to a flowchart depicted in FIG. 2. The actions do not have to be taken in the order stated below, but may be taken in any suitable order. Actions performed in some embodiments are marked with dashed boxes.

Action 201. The wireless communication network 1, e.g. the first radio capable device 10 or the access point 12, may determine that the first radio capable device 10 is of the first type with an energy harvesting capacity or an energy harvesting capacity with a battery capacity below or equal a threshold.

Action 202. The wireless communication network 1 according to embodiments herein prioritizes the first radio capable device 10 over a second radio capable device for accessing the wireless medium based on a respective type of the first radio capable device 10 and the second radio capable device. The first radio capable device 10 is of the first type with an energy harvesting capacity or an energy harvesting capacity with a battery capacity below or equal a threshold, and the second radio capable device is of the second type with a non-energy harvesting capacity or an energy harvesting capacity with a battery capacity above the threshold. The threshold may be defined by a storage time of energy in a power source of the first radio capable device 10 and/or an energy amount of a power source of the first radio capable device 10. The wireless communication network 1 may prioritize the first radio capable device 10 by configuring the first radio capable device 10 with an access parameter, which access parameter prioritizes the first radio capable device 10 over the second radio capable device. The access parameter may be broadcast or all access parameters for all different types of radio capable devices may be broadcast from the access point 12 and the access parameter may be retrieved by the first radio capable device 10 in a lookup table or as a default setting. The radio access parameter may alternatively be sent on a dedicated transmission to the first radio capable device 10. As an example, the wireless communication network 1 may use a carrier sensing multiple access function, and the access parameter may be at least one time interval, which at least one time interval is used by the first radio capable device 10 to sense whether the wireless medium is idle or busy by sensing energy on the wireless medium in the at least one time interval. Thus, the time interval is used when accessing the wireless medium and hence is an access parameter. The access parameter may be the at least one time interval but may, alternatively or additionally, be a transmission power. For example, the first radio capable device 10 may be prioritized in that an allowed transmission power for the first radio capable device 10 is higher than an allowed transmission for the second radio capable device, or that the second radio capable device, e.g. the other radio capable device 13, is limited in terms of transmission power, e.g. reduced beneath transmission power of the first radio capable device 10, when the first radio capable device 10 needs or tries to access the wireless medium. The at least one time interval may be below a time threshold when the first radio capable device 10 is of the first type. Thus, the least one time interval may allow the radio capable device 10 to access the wireless medium in a certain time window, e.g. an Energy Harvesting IFS (EHIFS). The access point 12 may alternatively or additionally configure a limited, and optionally dedicated, time access window for the first radio capable device 10. The at least one time interval may be defined by an inter-frame space, a backoff time, a restricted access window and/or a periodic access window. E.g. the at least one time interval may be related to IFS and the backoff time may be a random time to keep sensing the channel. But the at least one time may also be a shortened backoff time, a restricted access window and/or a periodic access window. The restricted access window and the periodic access window are configured from the access point 12, and by providing the restricted access window and the periodic access window to the first radio capable device 10 based on the type, the first radio capable device 10 is prioritized over the second type of radio capable devices. In 802.11ah, access window examples may be of Restricted Access Windows, Periodic Restricted Access Windows as defined in IEEE 802.11ah D3.0 section 9.22.5 and section 8.4.2.170b, and assigned time slots in RAW as defined in IEEE 802.11ah D3.0 Section 9.22.5.3.

Figure 3:
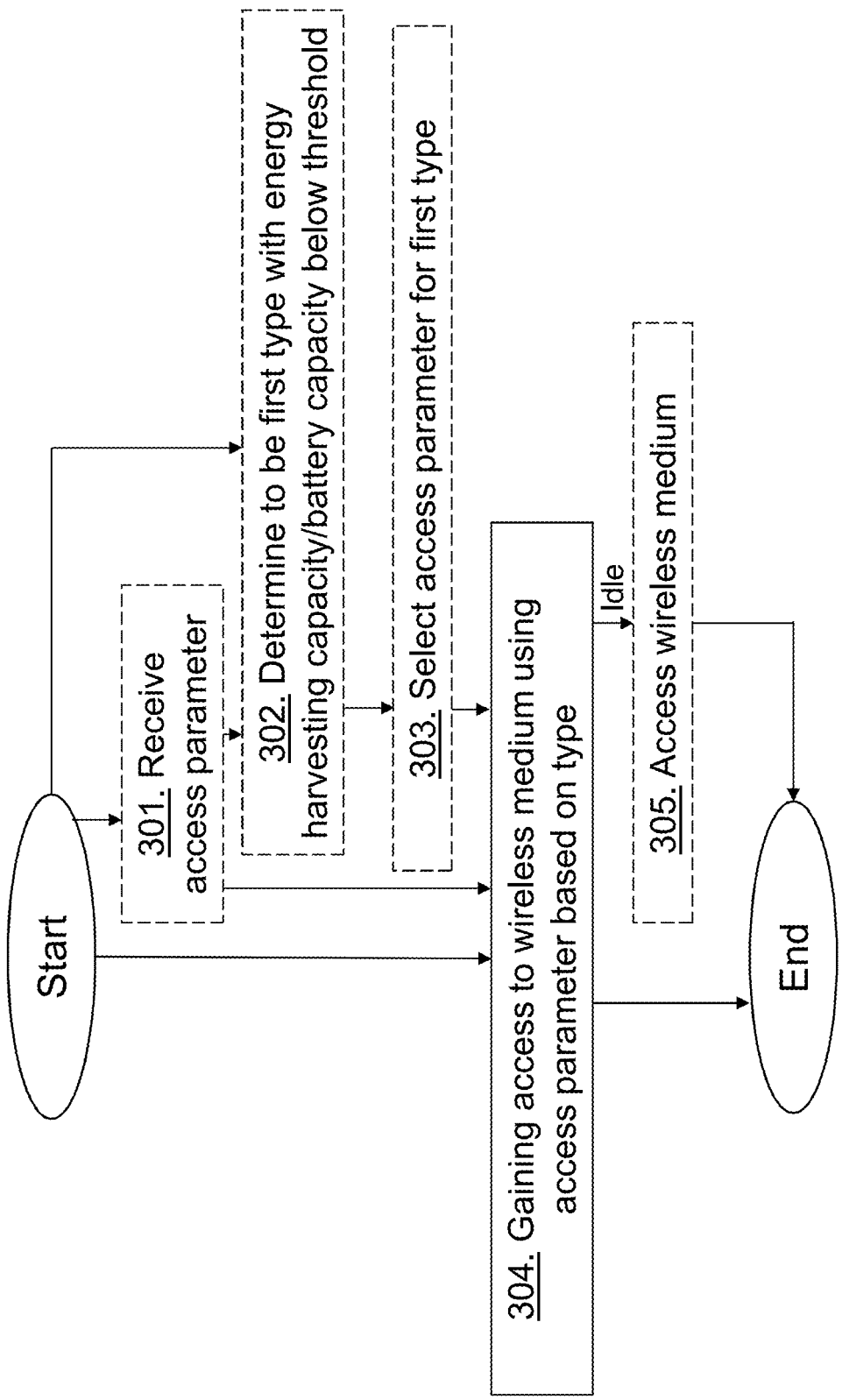
FIG. 3 is a schematic flowchart depicting a method performed in a first radio capable device according to embodiments herein.

The method actions performed in the first radio capable device 10 for handling access to a wireless medium in the wireless communication network 1 according to some embodiments will now be described with reference to a flowchart depicted in FIG. 3. The actions do not have to be taken in the order stated below, but may be taken in any suitable order. Actions performed in some embodiments are marked with dashed boxes.

Action 301. The first radio capable device 10 may receive the access parameter from the access point 12. This may be broadcast or dedicated transmitted. The access parameter for the first type may also be retrieved from a lookup table at the first radio capable device 10.

Action 302. The first radio capable device 10 may determine that the first radio capable device 10 is of the first type.

Action 303. The first radio capable device 10 may select, when determined to be of the first type, the access parameter associated with the first type, which access parameter allows prioritized access to the wireless medium over the second radio capable device being of the second type.

Action 304. The first radio capable device 10 gains access to the wireless medium by using the access parameter, which access parameter is based on the type of the first radio capable device 10. The first radio capable device 10 is of the first type being defined by an energy harvesting capacity or an energy harvesting capacity with a battery capacity below or equal a threshold. The access parameter gives the first radio capable device 10 priority, to access the wireless medium, over the second radio capable device. The second radio capable device is of the second type with a non-energy harvesting capacity or an energy harvesting capacity with a battery capacity above the threshold. The threshold is defined by a storage time of energy in the power source of the first radio capable device 10 and/or an energy amount of the power source of the first radio capable device 10. The access parameter may be at least one time interval and/or a transmission power as stated above. In some embodiments the first radio capable device 10 senses energy on the wireless medium in the at least one time interval to determine whether the wireless medium is idle or busy. The at least one time interval may below a threshold when the first radio capable device 10 is of the first type. The at least one time interval may be defined by an inter-frame space, a back-off time, a restricted access window and/or a periodic access window. The access parameter may be used when the wireless medium is sensed busy. The first radio capable device 10 may gain access by determining the wireless medium as idle or busy by performing via a Channel Sensing function in different time intervals, a first time interval defined by the access parameter and a second time interval defined by a back-off time, and/or a third time interval to access the wireless medium such as a restricted access window or a periodic access window. The first radio capable device 10 may also be prioritized in using a transmission power, which transmission power exceeds a transmission power of the second radio capable device when the access parameter is the transmission power.

Action 305. The first radio capable device 10 may, when the wireless medium is determined idle, access the wireless medium, e.g. For transmitting data to a different radio capable device or the access point 12.

Figure 4:
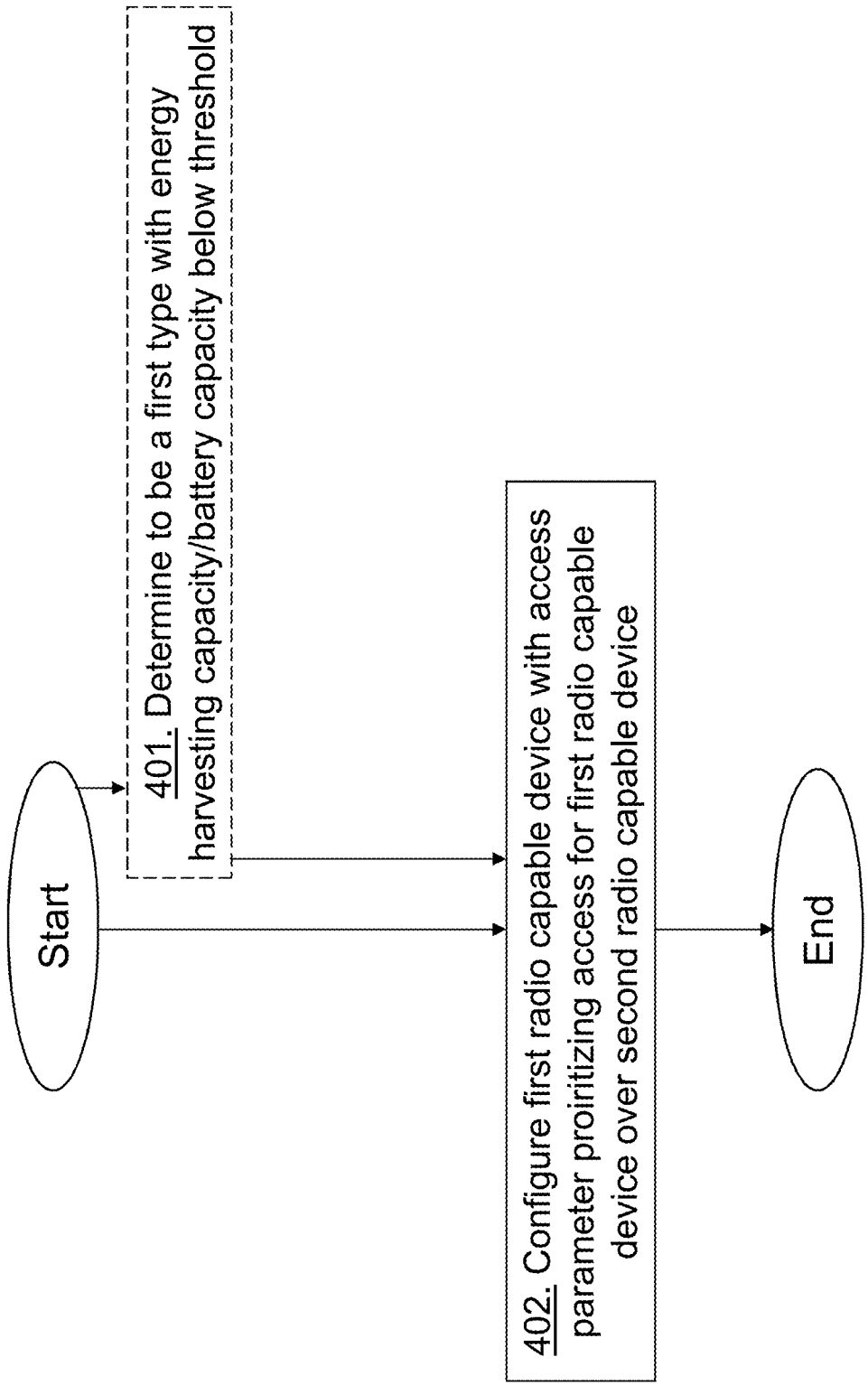
FIG. 4 is a schematic flowchart depicting a method performed in an access point according to embodiments herein.

The method actions performed in the access point for handling access of the first radio capable device 10 to a wireless medium in the wireless communication network 1 according to some embodiments will now be described with reference to a flowchart depicted in FIG. 4. The actions do not have to be taken in the order stated below, but may be taken in any suitable order. Actions performed in some embodiments are marked with dashed boxes.

Action 401. The access point 12 may determine that the first radio capable device 10 is of the first type with an energy harvesting capacity or an energy harvesting capacity with a battery capacity below or equal a threshold.

Action 402. The access point 12 may configure the first radio capable device 10 with an access parameter, which access parameter prioritizes the first radio capable device 10 over a second radio capable device for accessing the wireless medium based on a respective type of the first radio capable device 10 and the second radio capable device. The first radio capable device 10 is of the first type with an energy harvesting capacity or an energy harvesting capacity with a battery capacity below or equal a threshold, and the second radio capable device is of the second type with a non-energy harvesting capacity or an energy harvesting capacity with a battery capacity above the threshold. The access parameter may be the at least one time interval and/or the transmission power as stated above. The wireless communication network 1 may use a carrier sensing multiple access function, and the access parameter may be the at least one time interval, which at least one time interval is used by the first radio capable device 10 to sense whether the wireless medium is idle or busy by sensing energy on the wireless medium in the at least one time interval. The at least one time interval may be below a time threshold when the first radio capable device 10 is of the first type. The at least one time interval may be defined by an inter-frame space, a back-off time, a restricted access window and/or a periodic access window. Periodic Restricted Access Window (DRAW) and Restricted Access Window (RAW) may be assigned from the access point 12.

Figure 5:
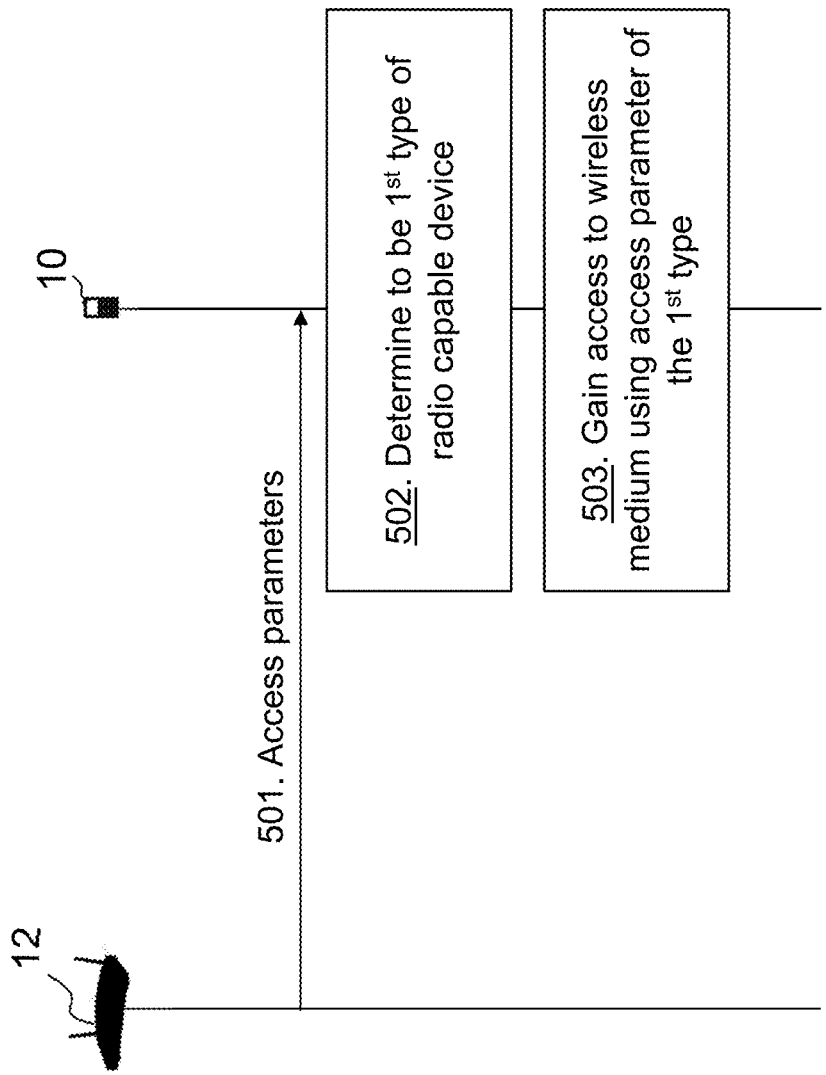
FIG. 5 is a schematic combined flowchart and signalling scheme according to embodiments herein.

An example is shown in the combined flowchart and signaling scheme in FIG. 5.

Action 501. The access point 12 configures the first radio capable device 10 by transmitting access parameter or parameters to the first radio capable device 10. In some embodiments the access point 12 can configure a limited, and optionally a dedicated, access window for the first radio capable device 10 being of the first type. However, the access parameters of different types may alternatively or additionally be stored in a lookup table in the first radio capable device 10 and then indicated from the access point 12 or selected internally of the first radio capable device 10.

Action 502. The first radio capable device 10 may determine that the first radio capable device 10 is of the first type with an energy harvesting capacity or an energy harvesting capacity with a battery capacity below or equal a threshold.

Action 503. The first radio capable device 10 gains access to the wireless medium by using the access parameter for the first type thereby prioritizing access over second type of radio capable devices. E.g. If the second radio capable device is a radio capable device with an energy harvesting capacity and with a battery capacity above the threshold, e.g., a sensor with a battery capacity to communicate a plurality of times, and the first radio capable device 10 is a radio capable device with an energy harvesting capacity but with a battery capacity below or equal the threshold, e.g., a sensor with a battery capacity to communicate only one time, the first radio capable device 10 is prioritized over the second radio capable device with e.g. Ea shorter access window or a higher transmission power.

Embodiments herein improve contention based protocols of the IEEE 802.11 & 802.11ah for energy harvesting devices, by introducing a first type of STA called first type radio capable device or Battery-less Energy Harvesting type STA such as the first radio capable device 10. The first radio capable device 10 may determine/select to behave as a first type radio capable device and utilize priority access to the wireless medium if one or more conditions are met. Otherwise, the first radio capable device 10 may determine/select to behave as a second type of radio capable device.

Priority is given by e.g. Introducing access parameters such as an Energy Harvesting Inter Frame Space or re-using the PIFS for priority, being an example of a first time interval, as well as an optimized random back-off time, being an example of a second time interval, selection for e.g. The first type of radio capable devices. The first type may have access parameters that allow the first radio capable device 10 to have priority when accessing the wireless medium with a contention based access procedure e.g. DCF and EDCA.

Figure 6:
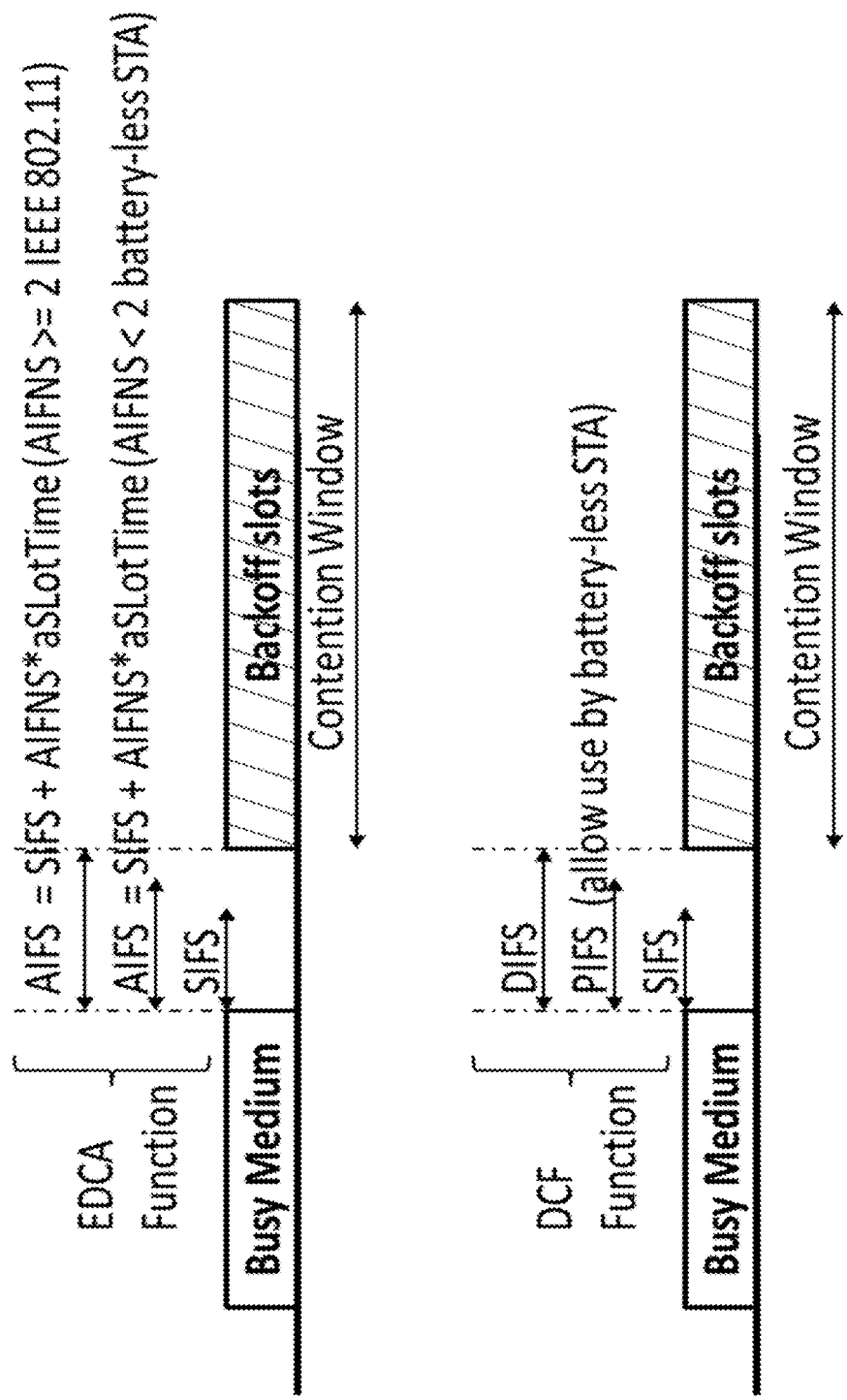
FIG. 6 is a schematic overview depicting time intervals during access procedures.

The first radio capable device 10 may only power on when there are suitable physical phenomena from which to harvest energy. The first radio capable device 10 may be considered similar as a sensor type STA but with access parameters prioritizing the first radio capable device 10 over a sensor type STA. Examples are shown in FIG. 6. In the lower part of the FIG. 6, there are three deferral times SIFS, PIFS and DIFS defined for the DCF procedure, see below. The PIFS may be used by the first radio capable device 10 to get priority access. In the upper part of the FIG. 6, two deferral times SIFS and AIFS are shown and defined for the EDCA function. The lowest value of AIFS defined in IEEE 802.11 is equal to SIFS+AIFSN*aSlotTime, wherein AIFSN is above or equal to 2. A new minimal value AIFS=SIFS+ AIFSN*aSlotTime, with AIFSN<2 is described herein which may be used by the first radio capable device 10 defining the at least one interval below the threshold '2', and gives priority to the first radio capable device 10 to access the wireless medium as the first radio capable device 10 gains access quicker or determines the wireless medium idle based on a shorter time interval.

As an example, the first radio capable device 10 being of the first type may e.g. harvest energy with a limited battery capacity, may also referred to as a battery-less energy harvesting device or simply as battery-less type STA, and participates in the wireless communication network 1 being the WLAN. The WLAN may be based on the standard 802.11ah. The first radio capable device 10 may e.g. be a S1G STA according to 802.11ah but with a battery capacity below or equal the threshold, wherein a S1G STA is a QoS STA and thus it uses the EDCA procedure for accessing the wireless medium.

The first radio capable device 10 may then select or determine to be a radio capable device with energy harvesting capacity or an energy harvesting capacity with a battery capacity below or equal a threshold if one or more of the following conditions are met:

the first radio capable device 10 does not have a battery i.e. threshold is equal to zero, there is not enough energy in the battery to power the first radio capable device 10 on, i.e. threshold is an energy level to power on the first radio capable device 10;

there is not enough energy in the battery to power the first radio capable device 10 on for a time needed by any other type of STA other a first type, i.e. threshold is an energy level to power on the first radio capable device 10 for a set time;

the battery of the first radio capable device 10 cannot any longer store the energy, i.e. threshold is a storage level of a battery capacity of the first radio capable device 10; or the first radio capable device 10 will only be powered on when there are suitable physical phenomena from which to harvest energy, i.e. threshold is a level of physical phenomena.

When the first radio capable device 10 has selected to be a first type radio capable device, then the access parameters, for e.g. EDCA, may be the following:

The AIFS, being an example of the first time interval, is equal to SIFS+AIFSN*aTimeSlot, where SIFS time and aTimeSlot are specified in the IEEE 802.11 standard. For sensor type STA and non-sensor Type STA, the minimum value for AIFSN is 2. To provide priority for first type radio capable devices, AIFSN may be set to less than 2, for example AIFSN=1 or AIFSN=0. With AIFSN=1, AIFS represents the same time as PIFS (PIFS=SIFS+aTimeSlot). This is shown in the upper part of FIG. 6.

The back-off time=Random( ), where Random( ) return may be a uniformly distributed random integer between [0, CW], where Contention Windom (CW) is in an interval between [CWmin, CWmax]. Minimum Contention Window (CWmin) and Maximum Contention Window (CWmax) may be set following the values defined for e.g. Ea sensor type STA.

Any other access parameter may be set in the same manner as for a sensor type STA.

According to some embodiments herein, the first radio capable device 10 will be able to content or to meet with sensor type STAs and have priority over them e.g. because of the reduced first time interval such as AIFS time. The combination of small deferral time and the back-off time derived from the smallest CW e.g. values of CWmin, improve the probability for the first radio capable device 10 to access the wireless medium with contention based access, hence giving priority to the first radio capable device 10. In some embodiments there is no need to communicate the first type to the access point 12 but just allow them to access the wireless medium faster, and these embodiments require no changes in behavior of the access point 12.

In some embodiments, the first radio capable device 10 is participating in a WLAN system that doesn't use EDCA procedure, but only DCF. The first radio capable device 10 may select to be of the first type if similar conditions as stated above are met. E.g. The first radio capable device 10 will only be powered on when there is a suitable physical phenomena from which to harvest energy. In this WLAN system, two types of STAs are present, the first type and the second type, which second type follows already specified access procedures in IEEE 802.11.

In this case, the WLAN system uses DCF procedure for wireless medium access and the first type has special access parameters for accessing the wireless medium in DCF. This is shown in the lower part of FIG. 6. The DCF procedure for first radio capable device 10 is as follows:

- A deferral time may be referred to as Energy Harvesting IFS, being an example of the first time interval, used in DCF access shall be exactly as PIFS time which is by definition SIFS+aTimeSlot. Because DIFS, first time interval for second types of radio capable devices, is defined as SIFS+2*aTimeSlot, first radio capable device 10 have priority over second type of radio capable devices.
- The back-off=Random( ), where Random( ) return a uniformly distributed random integer between [0, CW], where CW is in the interval between [CWmin, CWmax]. For second type of radio capable devices in DCF, CWmin and CWmax are set following the rules stated in 802.11. For first type radio capable devices, CWmin may be redefined as CWmin=(aCWmin+1)/4+1 which is the minimum value specified for CWmin in the default EDCA parameter set for any access category, and CWmax=aCWmin.
- Any other access parameter may be set in the same manner as DCF specifies.

The first radio capable device 10 will thus be able to content with other radio capable devices and have priority over them because PIFS<DIFS. The combination of small deferral time and the back-off time derived from the smallest values of CWmin improve the probability of the first radio capable device 10 to access the wireless medium with contention based access. In some embodiments there is no need to communicate the first type to the access point 12 but just allow them to access the wireless medium faster, and these embodiments require no changes in behavior of the access point 12.

Furthermore as stated above the first radio capable device 10 may in some embodiments, once determined to be a first type, transmit with a transmission power higher than the second radio capable device and thereby gain access to the wireless medium before the second radio capable device.

Figure 7:
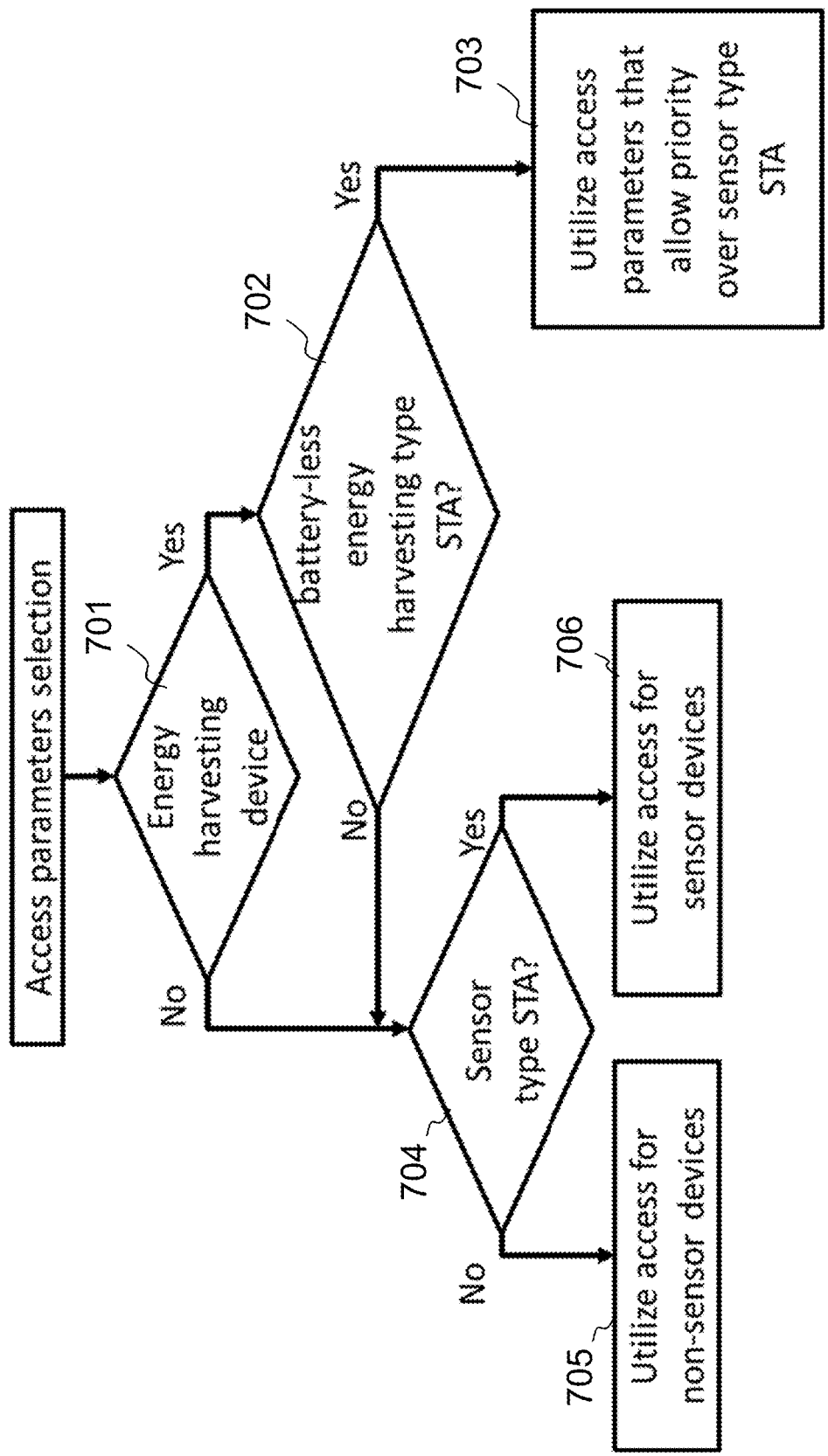
FIG. 7 is a schematic flowchart depicting a selection of access parameters based on type of radio capable devices.

FIG. 7 is a schematic flowchart for selecting access parameters based on type of radio capable device, being one example of the action 303 above. This may be performed in the first radio capable device 10 or in the access point 12.

Action 701. It is first determined whether the first radio capable device 10 is an energy harvesting device.

Action 702. That being the case, it is then determined whether the first radio capable device 10 has selected or determined to be a radio capable device with an energy harvesting capacity with a battery capacity below or equal a threshold, also referred to as a battery-less energy harvesting type STA or as the first type of radio capable devices.

Action 703. If the first radio capable device 10 is an energy harvesting device, and it opts to be a battery-less energy harvesting type STA, then the access parameters that allow priority over sensor type STA shall be used. Thus, the first radio capable device 10 may then utilize one or more access parameters that allow priority over sensor type STA.

Action 704. In case the first radio capable device 10 is not an energy harvesting device or not an energy harvesting capacity with a battery capacity below or equal a threshold it is determined whether the first radio capable device 10 is a sensor type device.

Action 705. In case the first radio capable device 10 is not a sensor type device it utilizes access parameters for non-sensor devices.

Action 706. In case the first radio capable device 10 is a sensor type device it utilizes access parameters for sensor devices.

Embodiments herein define a new type, a first type, of radio capable device e.g. Ea battery-less energy harvesting type STA in WLAN 802.11 system. The first type of radio capable device will be provided with priority for wireless medium access under contention based protocol based on IEEE 802.11 over second types of radio capable device. The priority is given based on the type of the radio capable device and regardless of the packets/flow access category to be transmitted. Priority is provided by e.g. shortening the time to listen before attempting transmission or higher transmission power.

Figure 8:
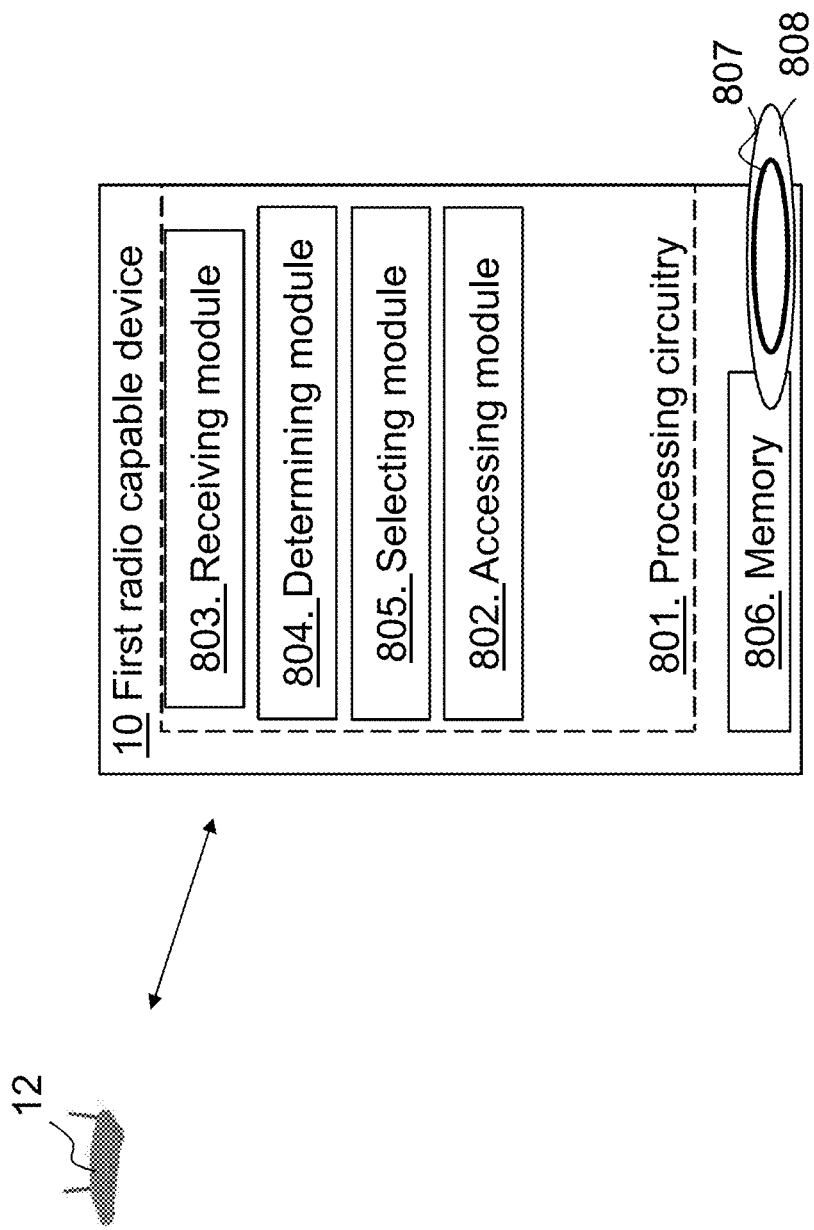
FIG. 8 is a block diagram depicting a first radio capable device according to embodiments herein.

In order to perform the methods herein a first radio capable device 10 is provided. FIG. 8 is a block diagram depicting the first radio capable device 10 for handling access to a wireless medium in the wireless communication network 1. The first radio capable device 10 is configured to gain access to the wireless medium by being configured to use an access parameter. The access parameter is based on the type of the first radio capable device 10, which first radio capable device 10 is of the first type being defined by an energy harvesting capacity or an energy harvesting capacity with a battery capacity below or equal a threshold. The access parameter gives the first radio capable device 10 priority, to access the wireless medium, over a second radio capable device, which second radio capable device is of a second type with a non-energy harvesting capacity or an energy harvesting capacity with a battery capacity above the threshold. The threshold may be defined by a storage time of energy in a power source of the first radio capable device 10 and/or an energy amount of the power source of the first radio capable device 10. The first radio capable device 10 may further be configured to receive the access parameter from the access point 12. The first radio capable device 10 may be configured, to gain access, to sense energy on the wireless medium in at least one time interval to determine whether the wireless medium is idle or busy, wherein the access parameter is the at least one time interval. The access parameter may be the at least one time interval and/or transmission power. The first radio capable device 10 may further be configured to access the wireless medium when the wireless medium is determined idle. The at least one time interval may be below a threshold when the first radio capable device 10 is of the first type. The at least one time interval is defined by an inter-frame space, a back-off time, a restricted access window, and/or a periodic access window. The first radio capable device 10 may be configured to use the access parameter when the wireless medium is first sensed busy. The first radio capable device 10 may be configured, to gain access, to determine the wireless medium as idle or busy by being configured to perform via a Channel Sensing function in different time intervals, a first time interval defined by the access parameter and a second time interval defined by a back-off time, and/or a third time interval to access the wireless medium. The first radio capable device 10 may be configured to determine that the first radio capable device is of the first type; and then to select the access parameter associated with the first type. The access parameter allows prioritized access to the wireless medium over the second radio capable device being of the second type.

The first radio capable device 10 may comprise processing circuitry 801.

The first radio capable device 10 may comprise an accessing module 802. The processing circuitry 801 and/or the accessing module 802 may be configured to gain access to the wireless medium by being configured to use an access parameter, which access parameter is based on the type of the first radio capable device 10. The first radio capable device 10 is of the first type being defined by an energy harvesting capacity or an energy harvesting capacity with a battery capacity below or equal a threshold. The access parameter gives the first radio capable device 10 priority, to access the wireless medium, over the second radio capable device. The second radio capable device is of the second type with a non-energy harvesting capacity or an energy harvesting capacity with a battery capacity above the threshold. The threshold may be defined by a storage time of energy in a power source of the first radio capable device 10 and/or an energy amount of a power source of the first radio capable device 10. The processing circuitry 801 and/or the accessing module 802 may be configured to gain access to the wireless medium by being configured to sense energy on the wireless medium in at least one time interval to determine whether the wireless medium is idle or busy. The access parameter may be the at least one time interval and/or transmission power. The processing circuitry 801 and/or the accessing module 802 may be configured to access the wireless medium when the wireless medium is determined idle. The at least one time interval may be below a threshold when the first radio capable device 10 is of the first type. The at least one time interval may be defined by an inter-frame space, a back-off time, a restricted access window, and/or a periodic access window. The processing circuitry 801 and/or the accessing module 802 may be configured to gain access by being configured to determine the wireless medium as idle or busy and by being configured to perform via a Channel Sensing function in different time intervals, a first time interval defined by the access parameter and a second time interval defined by a back-off time, and/or a third time interval to access the wireless medium such as an access window e.g. Ea DRAW or a RAW.

The first radio capable device 10 may further comprise a receiving module 803. The processing circuitry 801 and/or the receiving module 803 may be configured to receive the access parameter from an access point 12. The processing circuitry 801 and/or the accessing module 802 may be configured to use the access parameter when the wireless medium is first sensed busy.

The first radio capable device 10 may comprise a determining module 804. The determining module 804 and/or the processing circuitry 801 may be configured to determine that the first radio capable device 10 is of the first type.

The first radio capable device 10 may comprise a selecting module 805. The processing circuitry 801 and/or the selecting module 805 may be configured to select the access parameter associated with the first type, which access parameter allows prioritized access to the wireless medium over the second radio capable device being of the second type.

Furthermore, the first radio capable device 10 comprises a memory 806. The memory comprises one or more units to be used to store data on, such as battery thresholds, type of the first radio capable device, access parameters, applications to perform the methods disclosed herein when being executed, and similar.

The methods according to the embodiments described herein for the first radio capable device 10 are respectively implemented by means of e.g. Ea computer program 807 or a computer program product, comprising instructions, i.e., software code portions, which, when executed on at least one processor, cause the at least one processor to carry out the actions described herein, as performed by the first radio capable device 10. The computer program 807 may be stored on a computer-readable storage medium 808, e.g. Ea disc or similar. The computer-readable storage medium 808, having stored thereon the computer program, may comprise the instructions which, when executed on at least one processor, cause the at least one processor to carry out the actions described herein, as performed by the first radio capable device 10. In some embodiments, the computer-readable storage medium may be a non-transitory computer-readable storage medium.

Figure 9:
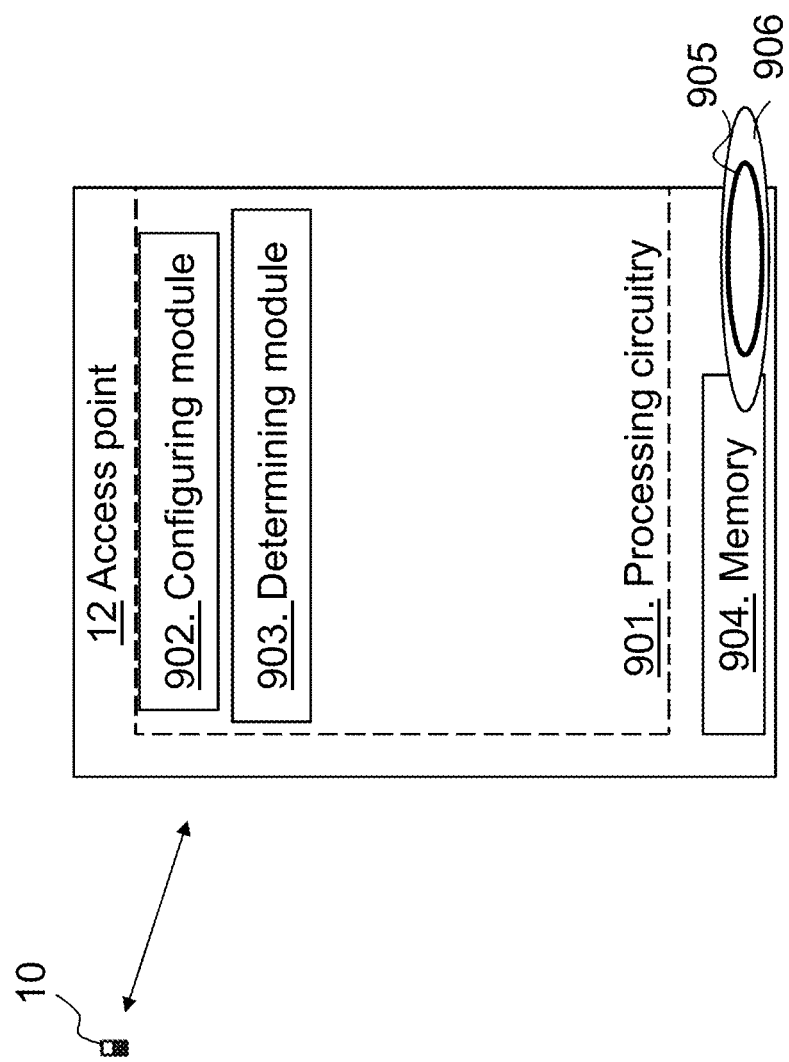
FIG. 9 is a block diagram depicting an access point according to embodiments herein.

In order to perform the methods herein an access point 12 is provided. FIG. 9 is a block diagram depicting the access point 12 for handling access of a first radio capable device 10 to a wireless medium in the wireless communication network 1. The access point 12 is adapted to configure the first radio capable device 10 with an access parameter, which access parameter prioritizes the first radio capable device 10 over the second radio capable device for accessing the wireless medium based on a respective type of the first radio capable device and the second radio capable device. The first radio capable device 10 is of a first type with an energy harvesting capacity or an energy harvesting capacity with a battery capacity below or equal a threshold, and the second radio capable device is of a second type with a non-energy harvesting capacity or an energy harvesting capacity with a battery capacity above the threshold. In some embodiments, the wireless communication network 1 uses a carrier sensing multiple access function. The access parameter may be the at least one time interval and/or a transmission power. The at least one time interval may be used by the first radio capable device 10 to sense whether the wireless medium is idle or busy by sensing energy on the wireless medium in the at least one time interval. The at least one time interval may be below a time threshold when the first radio capable device 10 is of the first type. The at least one time interval may be defined by an inter-frame space, a back-off time, a restricted access window, and/or a periodic access window. The access point 12 may be configured to determine that the first radio capable device 10 is of the first type with an energy harvesting capacity or an energy harvesting capacity with a battery capacity below or equal a threshold.

The access point 12 may comprise processing circuitry 901.

The access point 12 may comprise a configuring module 902. The processing circuitry 901 and/or the configuring module 902 may be adapted to configure the first radio capable device 10 with an access parameter, which access parameter prioritizes the first radio capable device 10 over the second radio capable device for accessing the wireless medium based on a respective type of the first radio capable device 10 and the second radio capable device. The first radio capable device 10 is of a first type with an energy harvesting capacity or an energy harvesting capacity with a battery capacity below or equal a threshold, and the second radio capable device is of a second type with a non-energy harvesting capacity or an energy harvesting capacity with a battery capacity above the threshold.

The access point 12 may comprise a determining module 903. The processing circuitry 901 and/or the determining module 903 may be configured to determine that the first radio capable device 10 is of the first type with an energy harvesting capacity or an energy harvesting capacity with a battery capacity below or equal a threshold.

Furthermore, the access point 12 comprises a memory 904. The memory 904 comprises one or more units to be used to store data on, such as battery thresholds, type of the first radio capable device, access parameters, applications to perform the methods disclosed herein when being executed, and similar.

The methods according to the embodiments described herein for the access point 12 are respectively implemented by means of e.g. Ea computer program 905 or a computer program product, comprising instructions, i.e., software code portions, which, when executed on at least one processor, cause the at least one processor to carry out the actions described herein, as performed by the access point 12. The computer program 905 may be stored on a computer-readable storage medium 906, e.g. Ea disc or similar. The computer-readable storage medium 906, having stored thereon the computer program 905, may comprise the instructions which, when executed on at least one processor, cause the at least one processor to carry out the actions described herein, as performed by the access point 12. In some embodiments, the computer-readable storage medium may be a non-transitory computer-readable storage medium.

The various example embodiments described herein are described in the general context of method steps or processes, which may be implemented in one aspect by a computer program product, embodied in a computer-readable medium, including computer-executable instructions, such as program code, executed by computers in networked environments. A computer-readable storage medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio capable device or an access point, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and radio node taught herein. As such, the radio node and techniques taught herein are not limited by the foregoing description and accompanying drawings. Instead, the embodiments herein are limited only by the following claims and their legal equivalents.

The invention claimed is:

1. A method performed in a wireless communication network for handling access of a first radio capable device to a wireless medium in the wireless communication network, the method comprising:
configuring the first radio capable device with an access parameter comprising a transmission power, wherein the transmission power is configured to prioritize the first radio capable device over a second radio capable device for accessing the wireless medium based on a respective type of the first radio capable device and the second radio capable device, wherein the first radio capable device is of a first type with an energy harvesting capacity or an energy harvesting capacity with a battery capacity below or equal to a threshold, and the second radio capable device is of a second type with a non-energy harvesting capacity or an energy harvesting capacity with a battery capacity above the threshold.

2. A method according to claim 1, wherein the threshold is defined by a storage time of energy in a power source of the first radio capable device and/or an energy amount of the power source of the first radio capable device.

3. A method according to claim 1, wherein the access parameter comprises the transmission power and at least one deferral time that is defined by an inter-frame space, a back-off time, a restricted access window, and/or a periodic access window.

4. A method according to claim 1, wherein the access parameter comprises the transmission power and at least one deferral time that is below a time threshold when the first radio capable device is of the first type.

5. A method according to claim 1, further comprising:
determining that the first radio capable device is of the first type with an energy harvesting capacity or an energy harvesting capacity with a battery capacity below or equal to a threshold;
wherein configuring comprises configuring the first radio capable device with the transmission power to prioritize the first radio capable device responsive to determining that the first radio capable device is of the first type.

6. A method according to claim 1, wherein the access parameter comprises the transmission power and at least one deferral time, wherein the at least one deferral time is an inter-frame space that is a deterministic time.

7. A method according to claim 1, wherein configuring the first radio capable device with the access parameter comprising the transmission power comprises:
configuring the first radio capable device with the access parameter comprising the transmission power and a deterministic time arbitration inter-frame space (AIFS) based on an arbitration inter-frame space number (AIFSN) when using an enhanced distributed channel access (EDCA) contention-based access function for the first radio capable device, wherein the AIFSN is less than two (2).

8. A method according to claim 1, wherein configuring the first radio capable device with the access parameter comprising the transmission power comprises:
configuring the first radio capable device with the access parameter comprising the transmission power and an Energy Harvesting inter-frame space (IFS) when using a distributed coordination function (DCF) contention-based access function for the first radio capable device, wherein the Energy Harvesting IFS is less than a deterministic time DCF inter-frame space (DIFS), wherein the Energy Harvesting IFS is equal to a point-coordination function (PCF) inter-frame space (PIFS) of the wireless communication network.

9. A method according to claim 1, wherein the access parameter comprises the transmission power and at least one deferral time used by the first radio capable device for channel sensing to defer access of the first radio capable device to the wireless medium.

10. A method performed in a first radio capable device for handling access to a wireless medium in a wireless communication network, the method comprising:
gaining access to the wireless medium by using an access parameter comprising a transmission power, wherein:
the transmission power is based on a type of the first radio capable device and prioritizes the first radio capable device over a second radio capable device for accessing the wireless medium;
the first radio capable device is of a first type being defined by an energy harvesting capacity or an energy harvesting capacity with a battery capacity below or equal to a threshold; and
the second radio capable device is of a second type with a non-energy harvesting capacity or an energy harvesting capacity with a battery capacity above the threshold.

11. A method according to claim 10, wherein the threshold is defined by a storage time of energy in a power source of the first radio capable device and/or an energy amount of a power source of the first radio capable device.

12. A method according to claim 10, further comprising:
receiving the access parameter from an access point.

13. A method according to claim 10, wherein the access parameter comprises the transmission power and at least one deferral time that is defined by an inter-frame space, a back-off time, a restricted access window, and/or a periodic access window.

14. A method according to claim 10, wherein the access parameter comprises the transmission power and at least one deferral time that is below a threshold when the first radio capable device is of the first type.

15. A method according to claim 10, further comprising, when the wireless medium is determined idle, accessing the wireless medium.

16. A method according to claim 10, wherein the access parameter is used when the wireless medium is sensed busy.

17. A method according to claim 10, further comprising:
determining that the first radio capable device is of the first type; and
selecting the transmission power associated with the first type, wherein the transmission power associated with the first type allows prioritized access to the wireless medium over the second radio capable device of the second type.

18. A method according to claim 10, wherein gaining access to the wireless medium by using the access parameter comprising the transmission power comprises:
gaining access to the wireless medium by using the access parameter comprising the transmission power and a deterministic time arbitration inter-frame space (AIFS) based on an arbitration inter-frame space number (AIFSN) when using an enhanced distributed channel access (EDCA) contention-based access function for the first radio capable device, wherein the AIFSN is less than two (2).

19. A method according to claim 10, wherein gaining access to the wireless medium by using the access parameter comprising the transmission power comprises:
gaining access to the wireless medium by using the access parameter comprising the transmission power and an Energy Harvesting inter-frame space (IFS) when using a distributed coordination function (DCF) contention-based access function for the first radio capable device, wherein the Energy Harvesting IFS is less than a deterministic time DCF inter-frame space (DIFS), wherein the Energy Harvesting IFS is equal to a point-coordination function (PCF) inter-frame space (PIFS) of the wireless communication network.

20. A method according to claim 10, wherein the access parameter comprises the transmission power and at least one deferral time used by the first radio capable device for channel sensing to defer access of the first radio capable device to the wireless medium.

21. A method performed in an access point for handling access of a first radio capable device to a wireless medium in a wireless communication network, the method comprising:
configuring the first radio capable device with an access parameter comprising a transmission power, wherein the transmission power prioritizes the first radio capable device over a second radio capable device for accessing the wireless medium based on a respective type of the first radio capable device and the second radio capable device, wherein the first radio capable device is of a first type with an energy harvesting capacity or an energy harvesting capacity with a battery capacity below or equal to a threshold, and the second radio capable device is of a second type with a non-energy harvesting capacity or an energy harvesting capacity with a battery capacity above the threshold.

22. A method according to claim 21, wherein the access parameter comprises the transmission power and at least one deferral time that is defined by an inter-frame space, a back-off time, a restricted access window, and/or a periodic access window.

23. A method according to claim 21, further comprising:
  determining that the first radio capable device is of the first type with an energy harvesting capacity or an energy harvesting capacity with a battery capacity below or equal to a threshold;
  wherein configuring comprises configuring the first radio capable device with the transmission power to prioritize the first radio capable device responsive to determining that the first radio capable device is of the first type.

24. A method according to claim 21, wherein configuring the first radio capable device with the access parameter comprising the transmission power comprises:
  configuring the first radio capable device with the access parameter comprising the transmission power and a deterministic time arbitration inter-frame space (AIFS) based on an arbitration inter-frame space number (AIFSN) when using an enhanced distributed channel access (EDCA) contention-based access function for the first radio capable device, wherein the AIFSN is less than two (2).

25. A method according to claim 21, wherein configuring the first radio capable device with the access parameter comprising the transmission power comprises:
  configuring the first radio capable device with the access parameter comprising the transmission power and an Energy Harvesting inter-frame space (IFS) when using a distributed coordination function (DCF) contention-based access function for the first radio capable device, wherein the Energy Harvesting IFS is less than a deterministic time DCF inter-frame space (DIFS), wherein the Energy Harvesting IFS is equal to a point-coordination function (PCF) inter-frame space (PIFS) of the wireless communication network.

26. A method according to claim 21, wherein the access parameter comprises the transmission power and at least one deferral time used by the first radio capable device for channel sensing to defer access of the first radio capable device to the wireless medium.

27. A first radio capable device for handling access to a wireless medium in a wireless communication network, wherein the first radio capable device is configured to:
  gain access to the wireless medium by being configured to use an access parameter comprising a transmission power, wherein:
    the transmission power is based on a type of the first radio capable device and prioritizes the first radio capable device over a second radio capable device for accessing the wireless medium;
    the first radio capable device is of a first type being defined by an energy harvesting capacity or an energy harvesting capacity with a battery capacity below or equal to a threshold; and
    the second radio capable device is of a second type with a non-energy harvesting capacity or an energy harvesting capacity with a battery capacity above the threshold.

28. A first radio capable device according to claim 27, wherein the threshold is defined by a storage time of energy in a power source of the first radio capable device and/or an energy amount of a power source of the first radio capable device.

29. A first radio capable device according to claim 27, further configured to receive the access parameter from an access point.

30. A first radio capable device according to claim 27, further configured to:
  determine that the first radio capable device is of the first type; and
  select the transmission power associated with the first type, wherein the transmission power associated with the first type allows prioritized access to the wireless medium over the second radio capable device of the second type.

31. An access point for handling access of a first radio capable device to a wireless medium in a wireless communication network, wherein the access point is configured to:
  configure the first radio capable device with an access parameter comprising a transmission power, wherein the transmission power prioritizes the first radio capable device over a second radio capable device for accessing the wireless medium based on a respective type of the first radio capable device and the second radio capable device, wherein the first radio capable device is of a first type with an energy harvesting capacity or an energy harvesting capacity with a battery capacity below or equal to a threshold, and the second radio capable device is of a second type with a non-energy harvesting capacity or an energy harvesting capacity with a battery capacity above the threshold.

32. An access point according to claim 31, wherein the access point is further configured to determine that the first radio capable device is of the first type with an energy harvesting capacity or an energy harvesting capacity with a battery capacity below or equal to a threshold, and wherein configuring comprises configuring the first radio capable device with the transmission power to prioritize the first radio capable device responsive to determining that the first radio capable device is of the first type.

* * * * *